United States Patent [19]

Kinnan

[11] Patent Number: 4,622,436

[45] Date of Patent: Nov. 11, 1986

[54] PLUG ASSEMBLY AND METHOD FOR ENCAPSULATING A CABLE WITHIN A CONDUIT

[75] Inventor: Frank R. Kinnan, Camas Valley, Oreg.

[73] Assignee: L & F Company, Camas Valley, Oreg.

[21] Appl. No.: 736,468

[22] Filed: May 21, 1985

[51] Int. Cl.$^4$ ............................................ H02G 15/00
[52] U.S. Cl. ............................. 174/77 R; 174/23 R; 174/99 R; 277/1; 277/112
[58] Field of Search ................... 174/23 R, 77 R, 99 R; 277/1, 112, 116.2; 156/48, 52; 138/108, 112

[56] References Cited

U.S. PATENT DOCUMENTS

| | | | |
|---|---|---|---|
| 1,851,940 | 3/1932 | Williams | 174/99 R |
| 3,569,608 | 3/1971 | Ance | 174/77 R X |
| 3,655,907 | 4/1972 | Philibert et al. | 174/77 R |
| 4,207,552 | 6/1980 | Brent | 174/77 R X |
| 4,256,920 | 3/1981 | Ayres et al. | 174/23 R X |
| 4,267,401 | 5/1981 | Wilkinson | 174/77 R |
| 4,332,975 | 6/1982 | Dienes | 174/77 R |

FOREIGN PATENT DOCUMENTS

| | | | |
|---|---|---|---|
| 2523843 | 12/1976 | Fed. Rep. of Germany | 156/48 |
| 2805059 | 8/1978 | Fed. Rep. of Germany | 174/77 R |
| 3240339 | 5/1984 | Fed. Rep. of Germany | 174/77 R |

Primary Examiner—Arthur T. Grimley
Assistant Examiner—Morris H. Nimmo
Attorney, Agent, or Firm—Kolisch, Hartwell & Dickinson

[57] ABSTRACT

A plug assembly for encircling a cable and encapsulating it within a conduit includes a first and second ring members, each of which is formed of resilient material and has an inner wall conformable to a circumferential portion of the cable's outer surface. A rigid spacer is disposed between the first and second ring members for defining a sealant-receiving channel therebetween. Sealant material, such as a silicone compound, is dispensed within the channel, and a compression means associated with the plug assembly is operable for deforming the first and second ring members axially and radially, thereby to deform the channel so that at least some sealant material received in the channel is displaced into the region between the inner walls of the first and second ring members and corresponding portions of the cable's outer surface to provide a cushion/sealant between the ring members and the cable.

8 Claims, 8 Drawing Figures

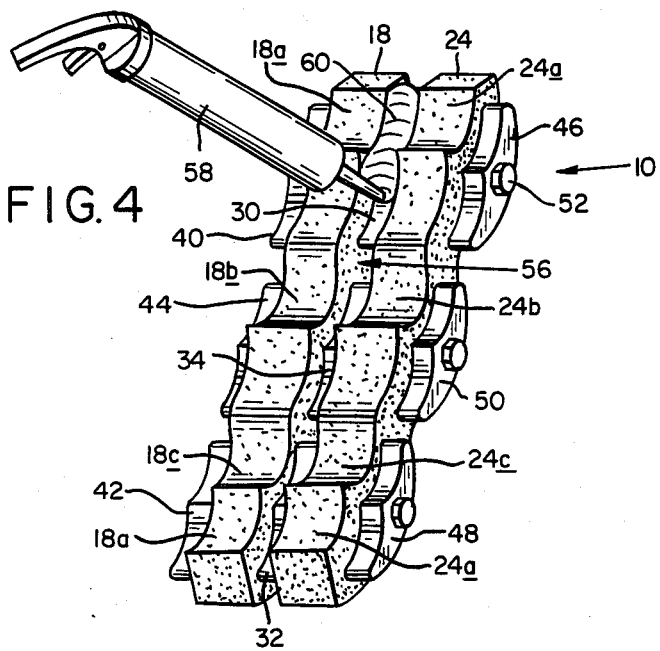
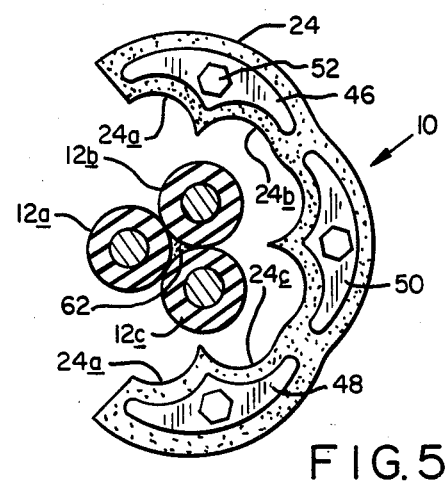
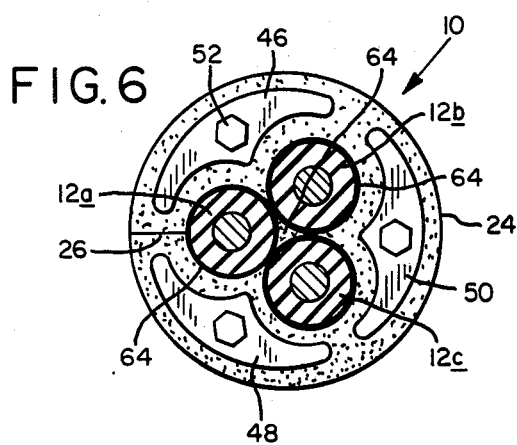
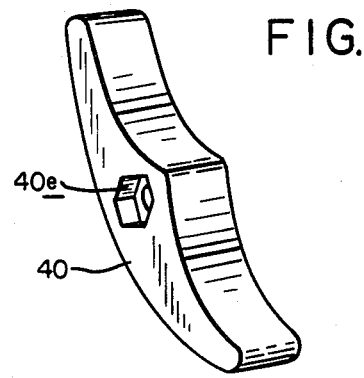
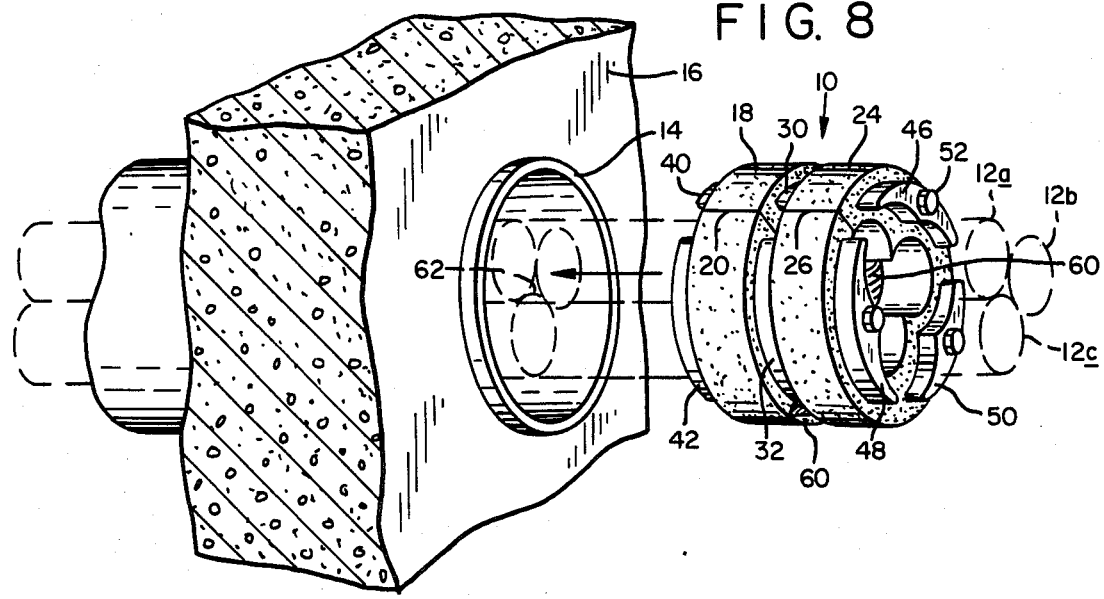

PLUG ASSEMBLY AND METHOD FOR ENCAPSULATING A CABLE WITHIN A CONDUIT

BACKGROUND AND SUMMARY OF THE INVENTION

The present invention relates to the sealing or encapsulating of cables within a conduit, for example, sealing electrical cables within a duct or conduit provided in the wall of an underground vault. More particularly, the invention is directed to a novel plug assembly and method for encircling the cables and encapsulating them within a vault wall conduit.

Equipment such as electrical power transformers are often installed underground within concrete vaults. The vaults provide an enclosure or housing for protecting the transformers from the elements, and it is necessary to interconnect the transformer with equipment above ground or with transformers contained within other remote underground vaults. Typically, vaults are designed with apertures in their walls for passing therethrough electrical conductors sheathed in dielectrics, such as plastic cables which provide electrical insulation. The cables extend through a suitable conduit provided in the vault wall, and it is necessary to seal the cables within that conduit to prevent water or gas intrusion into the transformer-containing vault.

In addition, transformers to be interconnected may be situated in vaults which are at different elevations. The cables which join the transformers are housed in a conduit which extends from one vault wall to another, but these conduits can become cracked or split due to ground movement or pressure, thereby permitting ingress of water into the conduit. If a break in the conduit occurs near its upper end, it is readily apparent that substantial hydrostatic pressures will be presented to a seal in the lower vault.

There have been many proposals for sealing cables within a conduit at the juncture where the cable passes through the vault wall. These devices, known as "plug assemblies," generally include some type of expandable element for mounting over the cable which will expand to grip the cable directly and also be forced against the internal wall of the conduit to provide sealing. However, there are specific problems concerning providing an adequate seal, not the least of which is that a conduit in the vault wall may be "out-of-round," a condition which occurs when concrete is poured around the conduit during construction resulting in the conduit becoming warped or distorted. Thus, it has been difficult to provide a plug assembly which will expand in a manner to compensate for the asymmetry of the conduit. In addition, the plastic cables which provide a dielectric sheath for the electrical lines may contract or expand, due to various conditions, which tend to break the seal between the plug assembly and the cable. The cables may also "whip," and move back and forth, a condition particularly prevalent in high voltage cable (600 volts and above). In addition, so-called "concentric neutrals," i.e., ground wires, may be spirally woven over the cables which present open areas between the plug assembly and the cables thereby providing a passage for water or gas intrusion.

Moreover, conventional plug assemblies tend to apply concentrated pressure points on the cables which cause the plastic material of the cables to "cold-flow," resulting in uneven electrical insulation around the electrical lines. This can become a significant problem when it is recognized that multiple cables may be disposed through a plug assembly, and if sufficient electrical stresses are created, due to improper insulation because of the "cold-flow" situation mentioned above, electrical shorts can occur.

With the above problems in mind, it is a general object of the present invention to provide a plug assembly for encircling a cable or cables for encapsulation within a vault-wall conduit for engaging the cables with substantially equal radial pressure distribution to avoid concentrated forces or pressure points on the cables which cause the insulation to "cold-flow."

In addition, it is a another object of the present invention to provide a plug assembly which will ensure that if the cables are provided with concentric neutrals, adequate sealing will be provided; moreover, it is an object to provide a plug assembly which will maintain a seal when the cables contract or distort or move longitudinally ("whip") within the plug assembly.

To the above ends, the plug assembly of the present invention includes dual compression members, such as a first ring member formed of flexible or resilient material having an inner wall comformable to a circumferential portion of a cable's outer surface, and a second ring member, disposed adjacent the first ring member, also formed of resilient material which has an inner wall conformable to a circumferential portion of the cable's outer surface. Disposed between the first and second ring members is a substantially rigid spacer means which defines a sealant-receiving channel between the ring members. A compression means associated with the plug assembly is operable for deforming the first and second ring members axially and radially thereby to deform the channel so that at least some sealant material received therein is directed or "squeezed" into the region between the inner walls of the first and second ring members and corresponding portions of the cable's outer surface. The net result is a substantially uniform cushion/sealant presented between the ring members and the cable. Concerning the sealant material, it is contemplated that a suitable silicone compound known as "RTV" (room temperature vulcanizing silicone) is used. The sealant material may be dispensed by means of a caulking gun or the like within the channel, prior to the plug assembly being assembled around a cable or cables.

Another object of the present invention is to provide a plug assembly in which the compression means includes rigid members mounted on the external sides of each ring member, and wherein a biasing means interconnects the rigid members, ring members and spacer means. The biasing means may be manipulated to shift the rigid members toward one another to compress the first and second ring members against the spacer means so that the channel decreases in width, thereby directing sealant material therefrom into the region between the inner walls of the first and second ring members and corresponding outer wall portions of a cable.

Still another object of the present invention is to provide a plug assembly, as set forth above, in which the spacer means includes an arcuate surface facing internally toward a cable. Thus, when the channel is filled with sealant material, the arcuate surface, upon compression of the compression means, ensures that a relatively uniform flow of sealant material to the region between the inner walls of the ring members and outer surfaces of a cable will result, ensuring substantially equal radial pressure distribution.

These and additional objects and advantages of the present invention will be more readily understood after a viewing of the drawings and the detailed description of the preferred embodiment.

BRIEF DESCRIPTION OF THE DRAWINGS

FIG. 4 is a view showing the plug assembly splayed to an open position for receiving sealant material;

FIG. 5 is an end view showing the plug assembly as it is initially assembled around a cable bundle;

FIG. 6 is an end view showing the plug assembly completely assembled around the cable bundle;

FIG. 7 is an isolated view of one of the components of the compression means of the plug assembly; and FIG. 8 is a view showing an assembled plug assembly according to the present invention prior to its being inserted within the conduit provided in the vault wall.

DETAILED DESCRIPTION OF THE PREFERRED EMBODIMENT

Figure 1:
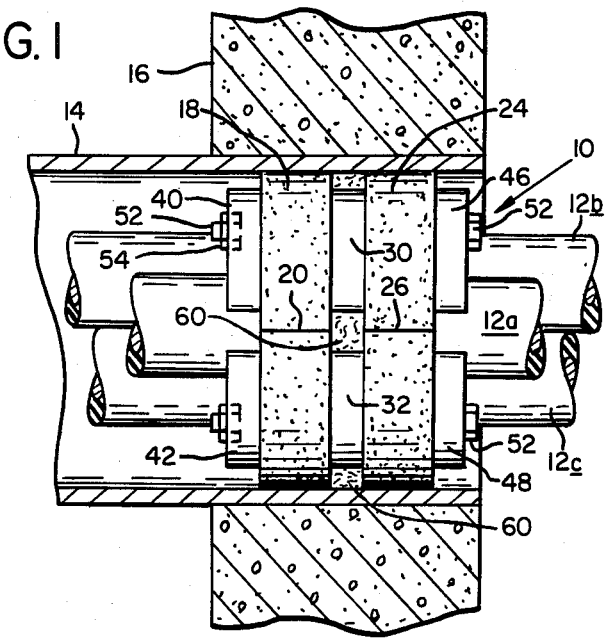
FIG. 1 is a side elevational view, taken in cross section, of a portion of a vault wall showing a plug assembly in accordance with the present invention mounted within a conduit extending through the vault wall.

As stated at the outset, the plug assembly of the present invention is configured specifically for encircling at least one cable (or a cable bundle) for encapsulation within a conduit extending through an aperture provided in the wall of an underground vault. As shown in FIG. 1, a plug assembly according to the invention, generally indicated 10, is shown in its expanded condition for encircling a cable bundle, generally indicated at 12, and for encapsulating those cables within a conduit 14 which extends through an aperture provided in a wall 16 of an underground vault. The cable bundle, at least in this example, includes three cables indicated at 12a, 12b and 12c. The cables are solid plastic sheaths which provide insulation and concentrically surround electrical line (not shown). The cables are arranged with their longitudinal axes generally parallel as shown, and are grouped as a bundle for being gripped or encapsulated by plug assembly 10. Conduit 14 extends to the left, for example, upwardly to an elevated vault (not shown) for providing protection to the cables.

Figure 2:
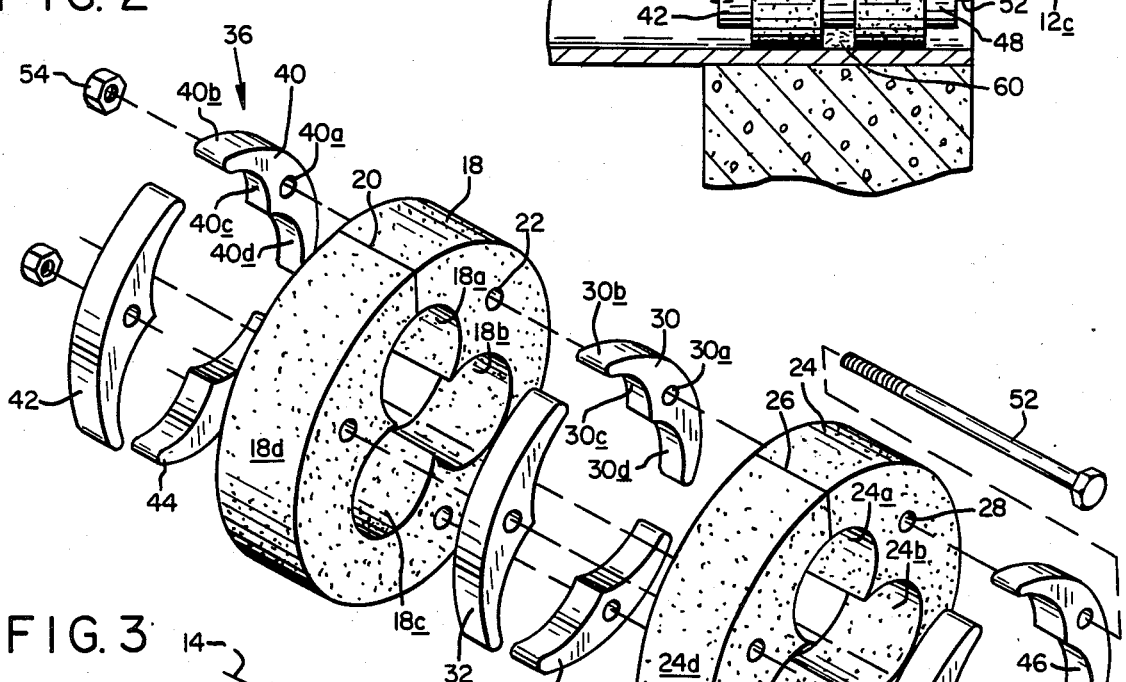
FIG. 2 is an exploded view illustrating the component parts of the plug assembly.

The specific components of plug assembly 10 are illustrated in the exploded, perspective view of FIG. 2. A first ring member is indicated at 18, and is formed of resilient material, such as foam rubber, and includes an inner wall conformable to a circumferential portion of the cables. Specifically, the inner wall includes, in this case, inner wall portions 18a, 18b and 18c configured for concentric fitting over the cables, such as cables 12a, 12b and 12c, respectively. It will be noted that first ring 18 also includes a split represented by parting line 20 extending from wall 18a to outer surface 18d of the first ring member. Additionally, cylindrical apertures 22 extend through the thickness of the first ring member.

Similarly, a substantially congruent second ring member 24, also formed of resilient material such as foam rubber, is disposed adjacent the first ring member. Second ring member 24 also includes an inner wall, including inner wall portions 24a, 24b and 24c conformable to corresponding circumferential portions on cable bundle 12. Second ring member 24 includes a split, indicated by a parting line shown at 26 extending from inner wall 24a to outer surface 24d of the second ring member. Similar to first ring member 18, the second ring member includes elongate apertures, such as indicated at 28, extending from its sides through its thickness.

In the exploded view of FIG. 2, it will be noted that there are a plurality of spacer means such as indicated at 30, 32 and 34 which are disposed between the first and second ring members. The spacer means, such as spacer means 30, are formed of substantially rigid material, such as hard rubber or plastic (polypropylene, for example), and each includes an aperture, such as aperture 30a extending therethrough alignable with corresponding apertures in the first and second ring members, such as apertures 22, 28, respectively. Spacer means 30 is formed with an arcuate outer surface 30b, and also includes a pair of arcuate surfaces 30c, 30d which transition into one another and are dimensioned with an arc conforming generally with that of the inner wall portions of the first and second ring members, such as inner wall portions 18a, 18b, etc. Similarly, spacer means 32, 34 are configured with a pair of transitioning arcuate sections which face inwardly as shown in FIG. 2.

Still viewing FIG. 2, a further component of plug assembly 10 includes a compression means, generally indicated by the arrangement of opposed sets of rigid members, generally indicated to the left of FIG. 2 at 36 and at the right thereof at 38. Considering set 36, it can be seen that it includes rigid members 40, 42 and 44. Each of the rigid members is substantially identical in construction, and moreover, is substantially identical in construction to the spacer means such as indicated at 30, 32 and 34. Rigid member 40 is also provided with an aperture 40a, and it includes an arcuate outer surface 40b, and transitioning internal arcuate surfaces 40c, 40d facing inwardly. Similarly, set 38, shown to the right of FIG. 2, includes rigid members 46, 48 and 50, substantially identical with the rigid members of set 36, and alignable therewith by suitable apertures.

Rounding out a description of the compression means, there are provided biasing means, such as elongate, adjustable fastening means, preferably taking the form of bolt and nut assemblies, one of which is indicated at 52 and 54. The bolts interconnect the rigid members, ring members and spacer means and are selectively positionable for displacing the rigid members toward one another in a manner which will be hereinafter described. It will be noted in FIG. 7 that the rigid members shown to the left of FIG. 2, such as rigid member 40, includes a nut-receiving recess 40e.

Figure 3:
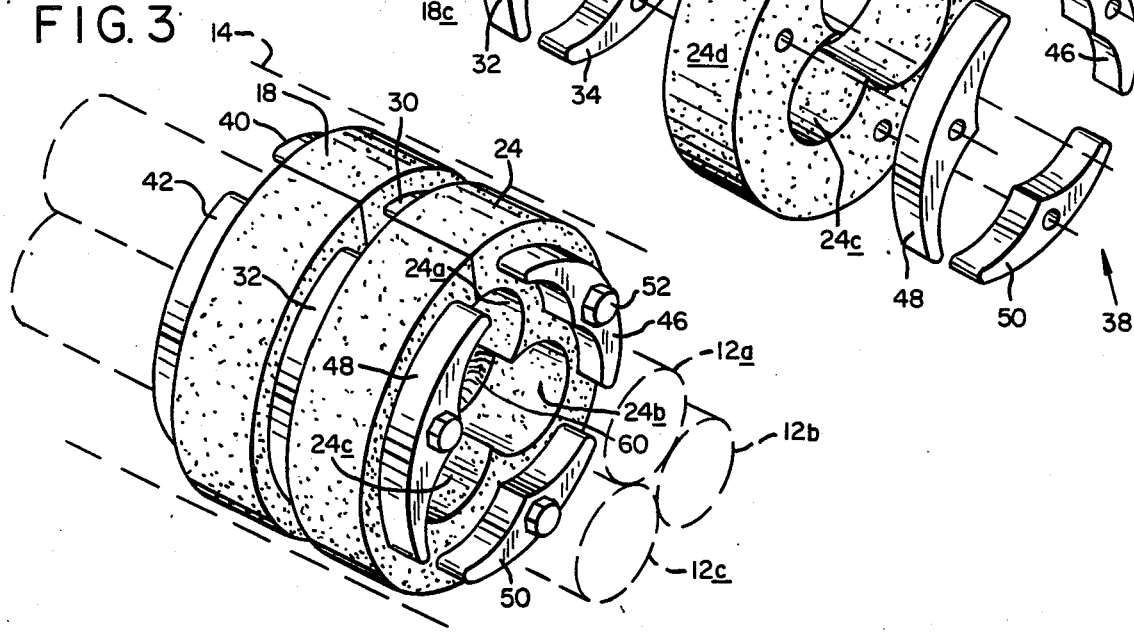
FIG. 3 is an assembled view of the component parts of the plug assembly.

The plug assembly is shown in assembled configuration in FIG. 3, wherein the fastening means or bolts, such as indicated at 52, are suitably disposed through the aligned apertures along the dashed line (as shown in FIG. 2) to assemble the plug assembly in a unitary construction. Upon relative tightening of the nuts, such as nut 54 on the bolts, such as bolt 52, the compression means is operable for deforming the first and second ring members axially and radially thereby.

With attention now directed to FIG. 4, which depicts plug assembly 10 arranged in its assembled configuration and splayed to an open position, but without significant deformation of first ring member 18 and second ring member 26, it can be seen that spacer means 30, 32 and 34 separate the internal sides of the first and second ring members so as to define a continuous channel, generally indicated at 56. The purpose of the channel is to receive suitable sealant material therewithin. Specifically, a silicone compound sealant material, such as "RTV" (room temperature vulcanizing silicone) is applied as a bead throughout the length of the channel by means of a suitable caulking gun 58 or the like. The sealant material is dispensed into the channel for reasons which will be described.

INSTALLATION OF THE PLUG ASSEMBLY

The procedure for installing plug assembly 10 within a conduit, such as conduit 14, to encircle the cable bundle and encapsulate it within the conduit will now be described. Initially, as shown in FIG. 4, plug assembly 10 is assembled with the bolts extending through the component parts as illustrated, but no significant take-up via the nuts is effected, so that the first and second ring members are in basically a noncompressed state. The plug assembly is opened or splayed outwardly, as shown in FIG. 4, and sealant material 60 ("RTV" silicone) is dispensed as a bead via caulking gun 58 into channel 56 throughout its length. The plug assembly, with its ring members and component parts splayed outwardly, is then moved into position around the cable bundle, as shown in FIG. 5, for eventual closure around the cable bundle as shown in FIG. 6. Additional sealant material may then be dispensed between the cables, in the area indicated at 62 in FIG. 5, which would be internal of conduit 14 as shown in FIG. 8.

Next, as also shown in FIG. 8, plug assembly 10 is positioned to fit within conduit 14 in the position shown in FIG. 1. At this point, a worker may suitably rotate the bolts to effect compression action on the first and second ring members, to encapsulate the cable bundle within the conduit. Specifically, the bolts and the rigid members define a compression means operable for deforming the first and second ring members axially and radially thereby so as to expand the outer walls of the first and second ring members, such as walls 18*d*, 24*d*, respectively, so that the ring members engage the internal wall of the conduit. Simultaneously with this compressing action, channel 56 is also deformed, i.e., it diminishes or decreases in width, thereby squeezing sealant material therefrom so that it is urged into the region between inner wall portions of the first and second ring members, such as inner wall portions 18*a*, 18*b*, 18*c* and 24*a*, 24*b*, 24*c*, respectively, and corresponding portions of the outer surfaces of the cable. The sealant material, now interposed between the inner walls of the first and second ring members and the outer surfaces of the cables provides a cushion/sealant therebetween. In other words, an annulus of sealant material is presented between the inner walls of the ring members and the cables. The sealant material interposed is indicated at 64 in FIG. 6.

Thus, what has been described is a plug assembly which includes dual compressible elements, such as the first and second ring members which deform a channel 56 so that the sealant material provides a dual function, i.e., it provides a seal between the ring members and the cables as well as a cushion. The cushion/sealing effect is very important, because as mentioned earlier, cables can contract and expand and shift longitudinally. Plug assembly 10 accommodates such movement and maintains the integrity of the seal. Water and gas intrusion is thereby effectively prevented.

Moreover, the displacing of sealant material between the inner surfaces of the ring members and the outer surface of the cables ensures that if concentric neutrals are present, i.e., if spiral ground wires are wound around the cables, then sealant material will flow or be dispensed to surround the voids between the spiral wires and the cable, thus ensuring a complete seal.

In addition, the sealant material, acting as a cushion with the foam rubber or resiliency of the ring members provides an equal distribution of forces around the cable. The equal distribution of forces is very important, because this prevents distortion or "cold-flow" of the plastic material of the cable and thereby avoids insulation distortion and the danger of a short.

The above description sets forth a plug assembly configured to seal three cables within a conduit; however, the plug assembly can also be made to encircle only a single cable. For example, the first and second ring members would be formed with an inner surface dimensioned with a diameter, when in the closed position, generally conformable to that of the single cable.

While the present invention has been shown and described with reference to the foregoing preferred embodiment, it will be apparent to those skilled in the art that other changes in form and detail may be made therein within the spirit and scope of the invention as defined in the appended claims.

It is claimed and desired to secure by Letters Patent:

1. A plug assembly for encircling at least one cable and encapsulating it within a conduit comprising:
   a first ring member formed of resilient material having an inner wall conformable to a circumferential portion of a cable's outer surface;
   a second ring member formed of resilient material disposed adjacent the first ring member, the second ring member also having an inner wall conformable to a circumferential portion of a cable's outer surface;
   substantially rigid spacer means disposed between the first and second ring members for defining a sealant-receiving channel therebetween; and
   compression means operable for deforming the first and second ring members axially and radially thereby to deform the channel so that at least some sealant material received in the channel is displaced into the region between the inner walls of the first and second ring members and corresponding portions of a cable's outer surface to provide a cushion/sealant between the ring members and a cable.

2. The plug assembly of claim 1 wherein the compression means includes rigid members mounted on the external sides of each ring member, and biasing means interconnecting the rigid members, ring members and spacer means selectively positionable for displacing the rigid members toward one another to compress the first and second ring members so that the channel decreases in width thereby urging sealant material therefrom.

3. The plug assembly of claim 2 wherein the biasing means includes elongate, adjustable fastening means disposed through apertures aligned in the rigid members, ring members and spacer means.

4. The plug assembly of claim 3 wherein the spacer means includes an arcuate surface facing internally toward a cable.

5. The plug assembly of claim 4 wherein the ring members are axially split to enable the ring members to be splayed outwardly for initial positioning around a cable.

6. A method for encircling at least one cable and encapsulating it within a conduit comprising:

providing a plug assembly defined by a pair of spaced-apart first and second ring members, each of which is formed of resilient material having an inner wall conformable to a circumferential portion of a cable's outer surface, the plug assembly also including a rigid spacer disposed between the first and second ring members for defining a sealant-receiving channel therebetween;

dispensing sealant material into the channel;

positioning the plug assembly around a cable;

positioning the plug assembly within a conduit; and deforming the first and second ring members axially and radially thereby to deform the channel so that at least some sealant material received in the channel is displaced into the region between the inner walls of the first and second ring members and corresponding portions of a cable's outer surface to provide a cushion/sealant between the ring members and a cable.

7. The method of claim 6 wherein the deforming step is accomplished by compressing the first and second ring members so that the channel decreases in width thereby urging sealant material therefrom.

8. The method of claim 7 wherein the displacing of sealant material into the region between the inner walls of the first and second ring members and corresponding portions of a cable's outer surface is accompanied by equal radial forces directed against the corresponding portions of a cable's outer surface.

* * * * *